(12) United States Patent
Ramarao et al.

(10) Patent No.: US 7,996,897 B2
(45) Date of Patent: Aug. 9, 2011

(54) LEARNING FRAMEWORK FOR ONLINE APPLICATIONS

(75) Inventors: Vishwanth Tumkur Ramarao, Sunnyvale, CA (US); Abhishek Kumar Pandey, Katihar (IN); Raghav Jeyaraman, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 859 days.

(21) Appl. No.: 12/011,114

(22) Filed: Jan. 23, 2008

(65) Prior Publication Data

US 2009/0187987 A1 Jul. 23, 2009

(51) Int. Cl.
*G06N 7/02* (2006.01)
(52) U.S. Cl. .......................................... 726/22; 706/52
(58) Field of Classification Search .................. None
See application file for complete search history.

(56) References Cited

U.S. PATENT DOCUMENTS

| | | | |
|---|---|---|---|
| 6,779,021 B1 | 8/2004 | Bates et al. | |
| 7,664,819 B2 * | 2/2010 | Murphy et al. | 709/206 |
| 2003/0088627 A1 * | 5/2003 | Rothwell et al. | 709/206 |
| 2003/0191969 A1 | 10/2003 | Katsikas | |
| 2004/0019650 A1 * | 1/2004 | Auvenshine | 709/206 |
| 2004/0093384 A1 | 5/2004 | Shipp | |
| 2004/0167964 A1 * | 8/2004 | Rounthwaite et al. | 709/206 |
| 2004/0267893 A1 * | 12/2004 | Lin | 709/207 |
| 2005/0060643 A1 | 3/2005 | Glass et al. | |
| 2005/0102366 A1 * | 5/2005 | Kirsch | 709/207 |
| 2006/0031303 A1 * | 2/2006 | Pang | 709/206 |
| 2006/0149821 A1 * | 7/2006 | Rajan et al. | 709/206 |

OTHER PUBLICATIONS

International Search Report, PCT/US05/26069, mailed Feb. 21, 2007, 7 pages.

* cited by examiner

*Primary Examiner* — David J Pearson
(74) *Attorney, Agent, or Firm* — Frommer Lawrence & Haug LLP; David W. Foster

(57) ABSTRACT

Learning to, and detecting spam messages using a multi-stage combination of probability calculations based on individual and aggregate training sets of previously identified messages. During a preliminary phase, classifiers are trained, lower and upper limit probabilities, and a combined probability threshold are iteratively determined using a multi-stage combination of probability calculations based on minor and major subsets of messages previously categorized as valid or spam. During a live phase, a first stage classifier uses only a particular subset, and a second stage classifier uses a master set of previously categorized messages. If a newly received message can not be categorized with certainty by the first stage classifier, and a computed first stage probability is within the previously determined lower and upper limits, first and second stage probabilities are combined. If the combined probability is greater than the previously determined combined probability threshold, the received message is marked as spam.

16 Claims, 10 Drawing Sheets

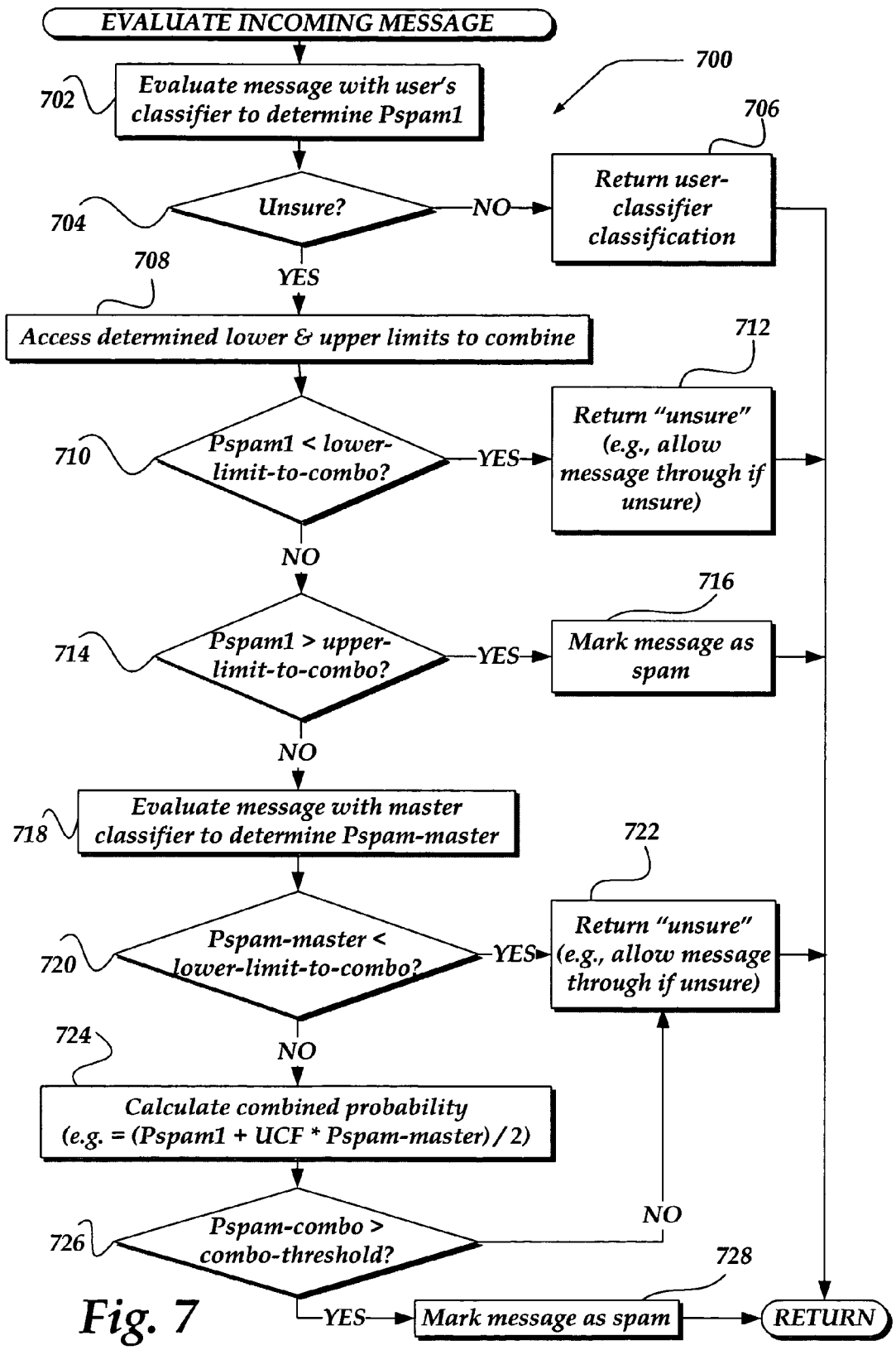

LEARNING FRAMEWORK FOR ONLINE APPLICATIONS

FIELD OF ART

The present invention is directed to filtering unsolicited messages (spam), and more particularly, but not exclusively to using aggregated information regarding unsolicited messages in combination with information from an individual user to train classifiers and determine whether a message is an unsolicited message.

BACKGROUND

The growth of the Internet in recent years has changed the way people communicate. For example, people often use one or more of email, Instant Messaging (IM), Short Messaging Services (SMS), chat rooms, and the like. People are employing such communication messaging services on desktops, laptops, and as well as mobile phones.

Along with the increased use of the Internet for communications has also come an increased use of email and other messaging for mass marketing. This form of marketing has become an attractive advertising mechanism for individuals, businesses, and the like, because it enables them to reach a large audience at a minimal cost. However, the use of messaging in this manner is often problematic for, and undesired by the recipients. Hence, a general term, spam, has arisen to describe these unsolicited messages. For certain types of messaging environments, an analogous term is used. For example, unsolicited messages in instant messaging (IM) environments are sometimes referred to as spim.

Such activities as spam, spim, and other forms of unsolicited messages have resulted in many people becoming more frustrated with their service providers and with communicating over public networks in general. Users often expect their service providers, or others, to protect them from such abuses.

Some service providers use a message filtering system to screen out as many unsolicited messages as possible without screening out valid messages. One filtering technique uses a Bayesian learning system to learn to recognize spam based messages identified by a user as spam. A Bayesian classifying system generally consists of a Bayesian algorithm and training information from each user corresponding to classification selections made by each user to identify valid and unsolicited messages (e.g., a vote that a message is-spam or is not-spam). The training information is used with the algorithm to make classification decisions on subsequent messages before the user sees the messages. To prevent false classification of messages, a message may be classified as "unsure" by the Bayesian classifier. This typically happens in cases where sufficient statistics are unavailable in the user's training database.

Due to the lack of training statistics in the user's database, often a large percentage of messages presented to the Bayesian classifier are classified as "unsure." This leads to wasting valuable computing resources such as bandwidth, server CPU time, and the like. Classifying a message as "unsure" also adds no information helpful in final message classification. Thus, it is with respect to these considerations, and others, that the present invention was made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein:

FIG. 7 illustrates a flow diagram generally showing one embodiment of a new message classification process for determining whether a newly received is a valid message or a spam message during a live phase.

DETAILED DESCRIPTION

Figure 1:
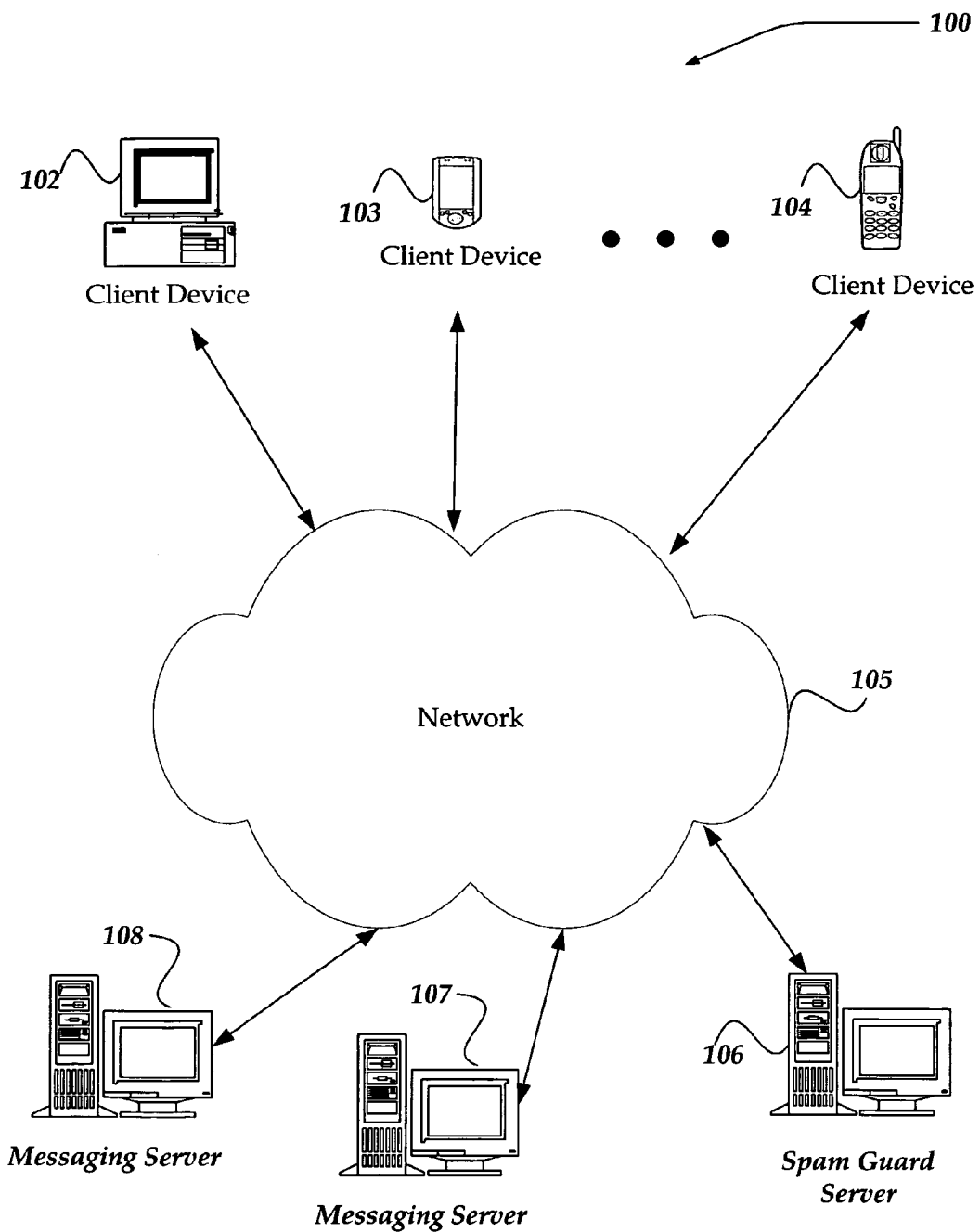
FIG. 1 shows a functional block diagram illustrating an example environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, embodiments of the present invention are directed towards a method, apparatus, and system for using aggregated classification information to learn to classify messages as valid or spam, when the messages could not be classified with certainty using only individual user training information. Valid messages are sometimes referred to as "notspam" or "ham." If there are not sufficient statistics for message classification in the user's database, a second-stage classifier uses statistics from an aggregated master database. The second-stage classification can be done on the basis of the combination of these two statistics. Accordingly, the second-stage classifier can push many "unsure" messages into the classified region, such as into the spam region as correctly as possible, while minimizing valid messages from being classified as spam. In an embodiment, the second-stage classifier "augments" the user training. One or more rules for combining Master database decisions and user database decisions minimizes false positives and maximizes the number of "unsure" mails pushed into the spam region.

In one embodiment, messages from an abusive sender, URL, or other source, may be blocked, or otherwise filtered. In one embodiment, a warning might be sent to the source. In another embodiment, the sender's account might be deactivated.

Some example embodiments are described below in terms of detecting spam messages using a multi-stage combination of probability calculations based on individual and aggregate training sets of previously identified messages. During a preliminary phase, an example master classifier is trained using messages that were previously categorized as valid of spam. Lower and upper limit probabilities, and a combined probability threshold are also iteratively determined using a multi-stage combination of probability calculations based on minor and major subsets of the previously categorized messages. During a live phase, an example first stage classifier is trained with only a particular subset of previously categorized messages, such as those of a single user. An example second stage classifier is trained with a master set, which also includes that particular subset. If a newly received message can not be categorized with certainty by the first stage classifier, and a computed first stage probability is within the previously determined lower and upper limits, the second stage classifier evaluates the received message to determine a second stage probability. In one embodiment, the first and second stage probabilities are combined as a weighted average. If the combined probability is greater than the previously determined combined probability threshold, the received message is marked as spam.

Although the example embodiments are described within in terms of a client-server architecture, the invention is not so limited. For example, various embodiments may also employ a server to server, or even a peer to peer architecture, without departing from the scope of the invention.

Illustrative Environment

FIG. 1 is a functional block diagram illustrating an example operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, messaging servers 107-108, and spam guard server 106. Client devices 102-104 are in communication with each other, messaging servers 107-108, and NSR server 106 through network 105. Messaging servers 107-108 and spam guard server 106 may also be in communication with each other through network 105.

Client devices 102-104 may include virtually any computing device capable of receiving and sending a message over a network, such as network 105, to and from another computing device. The set of such devices described in exemplary embodiments below generally includes general purpose client devices and typically connect using a wired communications medium at one or more fixed location such as personal computers, multiprocessor systems, laptop computers, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium. However, the set of such devices may also include devices that are usually considered more mobile devices that are usually considered more specialized devices with limited capabilities and typically connect using a wireless communications medium such as cell phones, smart phones, pagers, radio frequency (RF) devices, infrared (IR) devices, CBs, integrated devices combining one or more of the preceding devices, or virtually any mobile device, and the like.

Each client device within client devices 102-104 may include an application that enables a user to perform various operations. For example, each client device may include one or more messenger applications that enables the client device to send and receive messages to/from another computing device employing various communication mechanisms, including, but not limited to email, Instant Messaging (IM), Short Message Service (SMS), Multimedia Messaging Service (MMS), internet relay chat (IRC), Mardam-Bey's internet relay chat (mIRC), Jabber, and the like.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to Standard Generalized Markup Language (SGML), HyperText Markup Language (HTML), Extensible Markup Language (XML), a Handheld Device Markup Language (HDML), such as Wireless Markup Language (WML), WMLScript, JavaScript, and the like.

Network 105 is configured to couple client devices 102-104, with other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art.

Furthermore, remote computers and other related electronic devices could be remotely connected to either LANs or WANs via a modem and temporary telephone link. Network 105 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 105 includes any communication method by which information may travel between client devices 102-104, spam guard server 106, and/or messaging servers 107-108.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data. Such data can be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Messaging servers 107-108 includes virtually any network computing device that is configured to provide various resources, including content and/or messaging services over network 105. Messaging servers 107-108 may provide content and/or services for any of a variety of messaging applications, including, but not limited to email, IM, SMS, MMS, IRC, chat rooms, or the like.

In one embodiment, messaging servers 107-108 may also be configured to operate as a website server. However, messaging servers 107-108 may also operate as a File Transfer Protocol (FTP) server, a database server, content server, or the like. Additionally, each of messaging servers 107-108 may be configured to perform a different operation. Thus, for example, messaging server 107 may be configured as an IM messaging server, while messaging server 107 may be configured as an email server, a chat server, or the like. Moreover, while messaging servers 107-108 may operate as other than a website, they may still be enabled to receive an HTTP communication.

Devices that may operate as messaging servers 107-108 include, but are not limited to servers, personal computers, desktop computers, multiprocessor systems, microprocessor-based or programmable consumer electronics, network PCs, network appliances, and the like.

One embodiment of spam guard server 106 is described in more detail below in conjunction with FIG. 2.

Although spam guard server 106 and messaging servers 107-108 are illustrated as distinct network devices, the invention is not so limited. For example, a single network device may be configured to perform the operational aspects of spam guard server 106 and messaging servers 107-108, or even a plurality of network devices may be configured such that the operational aspects of spam guard server 106 and/or messaging servers 107-108 are distributed over the plurality of network devices.

Illustrative Server Environment

Figure 2:
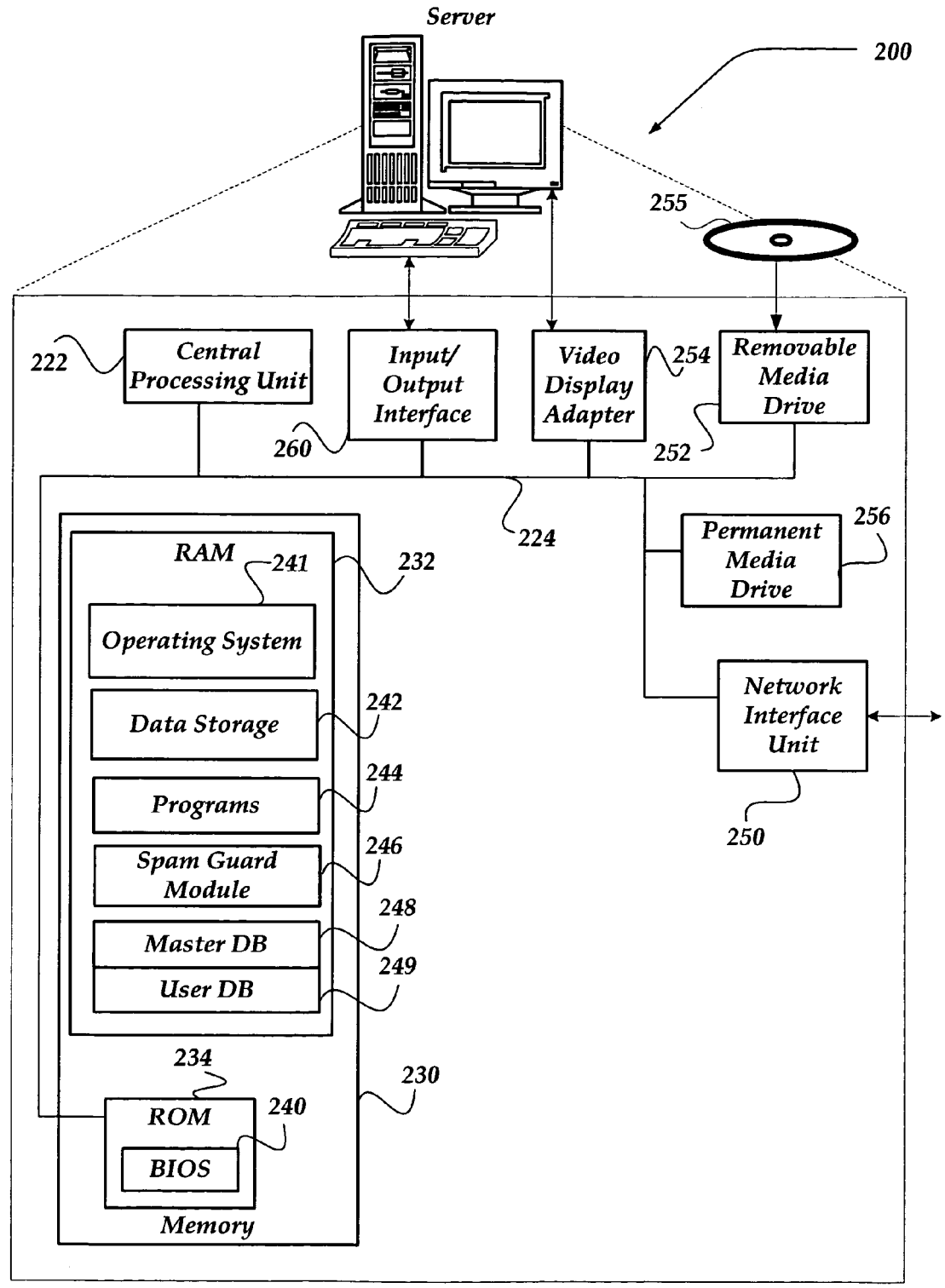
FIG. 2 shows one embodiment of a computing device that may be employed for practicing the invention.

FIG. 2 shows one embodiment of a computing device, such as a network device. Network device 200 may include many more, or fewer, components than those shown. The components shown, however, are sufficient to disclose an illustrative embodiment for practicing the invention. Network device 200 may represent, for example, spam guard server 106, messaging servers 107-108, or a client device of FIG. 1. For example purposes, network device 200 will be described as a server device.

As shown in the figure, server device 200 includes a processing unit 222 in communication with a mass memory 230 via a bus 224. Mass memory 230 generally includes a RAM 232, a ROM 234, and other storage means. Mass memory 230 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 230 stores a basic input/output system ("BIOS") 240 for controlling low-level operation of server device 200. The mass memory also stores an operating system 241 for controlling the operation of server device 200. It will be appreciated that this component may include a general purpose operating system such as a version of Windows, UNIX, LINUX, Solaris, or the like. The operating system may also include, or interface with a Java virtual machine module that enables control of hardware components and/or operating system operations via Java application programs.

Mass memory 230 further includes one or more data storage units 242, which can be utilized by server device 200 to store, among other things, programs 244 and/or other data. Programs 244 may include computer executable instructions which can be executed by server device 200 to implement a markup handler application, such as an HTTP handler application for transmitting, receiving, and otherwise processing messaging communications, HTTP communications, a WAP handler application for transmitting, receiving, and otherwise processing WAP communications, and the like. Similarly, programs 244 can include a secure socket layer (SSL) handler application for handling secure connections, such as initiating communication with an external application in a secure fashion. Other examples of application programs include content management applications, messaging applications, schedulers, calendars, web services, transcoders, database programs, word processing programs, spreadsheet programs, and so forth. Accordingly, programs 244 can process images, audio, video, or markup pages, enable telecommunication with another user of another electronic device, and/or other services.

In addition, mass memory 230 stores a spam guard module 246. Spam guard module 246 may include computer executable instructions, which may be run under control of operating system 241 to evaluate messages received by a messaging application of programs 244, receive user designations that messages are valid or spam, train classifiers, determine classifier parameters, identify valid and spam messages, or other operations related to messaging. In one embodiment, spam guard module 246 generally communicates with a messaging service on a client device. Spam guard module 246 also communicates with, or includes, a master database 248 and one or more user databases 249. Master database 248 generally manages information aggregated from multiple sources, such as training data for classifiers. User database 249 generally manages a subset of information, such as data for an individual user, a subset of users, a geographic region, a content topic, or the like.

Server device 200 also includes an input/output interface 260 for communicating with input/output devices such as a keyboard, mouse, wheel, joy stick, rocker switches, keypad, printer, scanner, and/or other input devices not specifically shown in FIG. 2. A user of server device 200 can use input/output devices to interact with a user interface that may be separate or integrated with operating system 241, programs 244, and/or other modules. Interaction with the user interface includes visual interaction via a display, and a video display adapter 254.

Server device 200 may include a removable media drive 252 and/or a permanent media drive 256 for computer-readable storage media. Removable media drive 252 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 255, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 250, server device 200 can communicate with a wide area network such as the Internet, a local area network, a wired telephone network, a cellular telephone network, or some other communications network, such as network 105 in FIG. 1. Network communication interface unit 250 is sometimes known as a transceiver, transceiving device, network interface card (NIC), and the like.

Illustrative Overall Process

Figure 3:
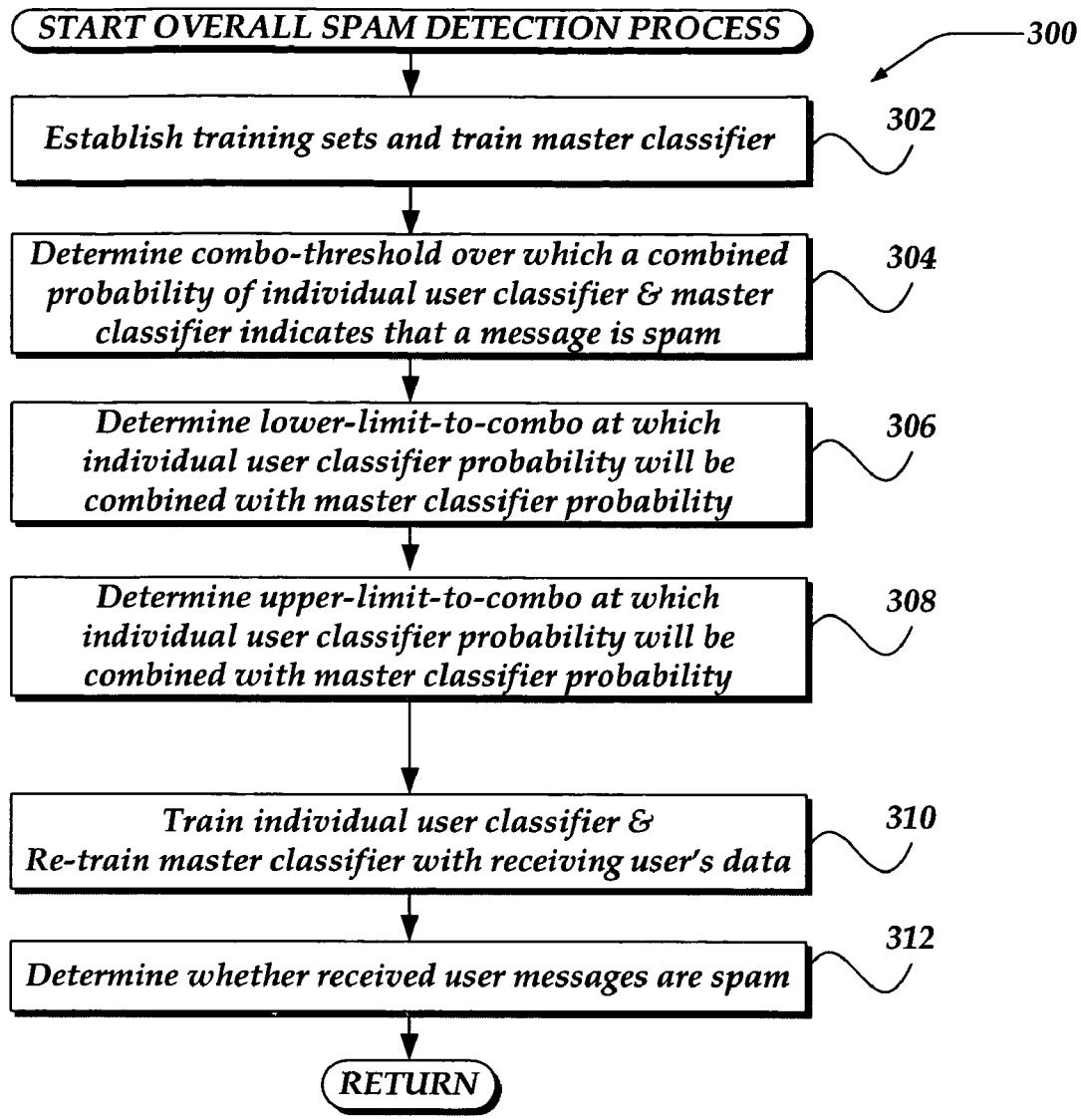
FIG. 3 illustrates a flow diagram generally showing one embodiment of an overview process for dynamically detecting spam or other abusive communications.

The operation of certain embodiments of the invention will now be described with respect to FIGS. 3-7. FIG. 3 illustrates a flow diagram generally showing one embodiment of an overview process 300 for dynamically detecting spam or other abusive communications. Process 300 of FIG. 3 may be implemented within various components of FIG. 2.

Example process 300 generally includes operations over at least a preliminary phase and a live phase. Each phase may include one or more stages. The preliminary phase generally comprises establishing sets of messages, training message classifiers, determining threshold values, and other preparatory actions. The preliminary phase may or may not involve some or both of static information and dynamically occurring or changing information. For example, training message classifiers may be done with existing sets of messages and/or with messages received in real-time during the training process.

Similarly, the live phase may involve some or both of static information and dynamically occurring or changing information. For example, messages may be evaluated in real-time, in a batch process, or a combination. The live phase generally comprises training individual user classifiers, training or retraining a master classifier, evaluating incoming messages, filtering, sorting, or other actions with current data.

In more detail, example overall process 300 begins the preliminary phase with an operation 302, in which training sets are established, classifiers are trained, and other initial steps are performed. As users receive messages, they can indicate whether each received message is a valid message or is a spam message. These manually specified messages can be used to train a corresponding spam guard module. A spam guard module includes one or more message classifiers, which subsequently attempt to classify later received messages as valid or as spam, before the user acts on the later received messages. In one embodiment, a classifier comprises a Bayesian filter. Each user's messaging account can be associated with a personalized Bayesian filter. A Bayesian filter works on the principle of the well known Bayes theorem. Each user provides the feedback on whether messages are valid or are spam. The feedback establishes a training set of messages to train the user's corresponding filter.

The spam guard module also establishes one or more training sets for training other classifiers, such as a master classifier (sometimes referred to as a second stage classifier). The spam guard module may use data from all users, or from a random sample of users who are each using a personalized Bayesian filter. This random sample of users is sometimes referred to herein as "userset1." From those sampled users in userset1, the spam guard may collect a random sample of messages. Each user, an administrator, an automated analyzer, or other evaluator may manually or automatically classify the sampled messages as either valid or spam. This operation provides known classification of the sampled messages.

These messages may be grouped in various ways. For example, a subset may comprise pre-classified messages that are associated with a particular user. Other embodiments may establish subsets based on geographic location, quality of service level, mobile network carrier, types of messages, content topic within messages, advertiser, or other characteristic (s). To simplify the description, example embodiments are generally described in terms of a subset of messages associated with an individual user who receives a new message. Although the invention is not so limited and may encompass any subset, an example embodiment described in terms of an individual user's messages may improve comprehension.

All, or a randomly selected portion of the sampled messages (e.g., 80%) may be established as a statistically randomized master set. In various embodiments, this randomize master set is sometimes referred to herein as "trainingset1," as "random-users master set," or other type of master set. The randomized master set generally includes messages that were pre-classified by a random selection of users. Alternatively, the randomized master set may include all messages that were pre-classified by all users. The randomized master set may or may not include messages of a particular user, or that are associated with a particular subset of messages, that may be involved in the live phase.

Another randomly selected portion of the sampled messages, or the remaining sampled messages (e.g., 20%), may be established as a randomized test set. This randomized test set is sometimes referred to herein as "testset1" or just "randomized subset." The randomized subset also generally includes messages from a random selection of users, or based on another shared characteristic. The randomized subset may or may not include messages of a particular subset or of a particular user that is involved in the live phase. For example, the randomized subset may not include messages that were pre-classified by a particular user that receives a new message during the live phase.

The message sets may be updated on a continuous basis, but once a set of pre-classified messages are established, the spam guard module can train a corresponding classifier. In a simple case, when a user manually classifies received messages, the spam guard module can train the user's corresponding classifier (e.g., Bayesian filter). Each user's Bayesian filter is also setup with at least two threshold parameters, T1Lower and T1Upper. T1Lower comprises a probability level below which a user's individual classifier can be confident that a message is valid. Conversely, T1Upper comprises a probability level above which a user's individual classifier can be confident that a message is spam. T1Lower and T1Upper can be different for each user's classifier or can be set to consistent values for all users. These threshold parameters may be predefined based on user input, field tests, or other empirical techniques.

The user's Bayesian filter will generally calculate a probability that a message is spam. This probability is sometimes referred to herein as Pspam1. If Pspam1 is less than T1Lower, the message would be marked valid ("notspam"). Conversely, if Pspam1 is greater than T1Upper, the message would be marked spam. If Pspam1 is between T1Lower and T1Upper, the message would be marked "Unsure." Messages marked as "unsure" are typically passed down to other filters for further analysis or are marked as "notspam." This generally results in increased computational cost with decreased effectiveness of the personal Bayesian classifier. Also, each user's classifier may misclassify messages if each user's classifier is trained with few or no manually classified messages. A misclassification occurs when the filter incorrectly marks good messages as spam, or marks spam messages as "notspam."

To reduce the number of messages that are marked as unsure or otherwise misclassified, a master classifier may also use aggregated messages from multiple users. The master classifier is trained with the aggregated messages of the randomized master set. The master classifier is sometimes called a second stage classifier. The master classifier will generate a probability that a given message is spam. This probability is referred to herein as Pspam-master. Details on training the master classifier are described below with regard to FIG. 4.

During the preliminary phase, the master classifier is also used with multiple individual classifiers to predetermine other threshold values. More specifically, at an operation 304, the spam guard module uses multiple individual classifiers and the master classifier to determine a combination threshold, over which a combined probability (from an individual user classifier and the master classifier) will indicate that a message is spam. Details on determining the combination threshold are described below with regard to FIGS. 5A and 5B.

The decision to calculate a combined probability will depend on two more limit values. Specifically, at an operation 306 of the preliminary phase, the spam guard module determines a lower limit to combine probabilities (lower-limit-to-combo). If a first stage probability (e.g., Pspam1) is greater than the lower-limit-to-combo, it may be appropriate to calculate a second stage probability with a master classifier and combine the first stage probability with the second stage probability (e.g., Pspam-master) to determine a combined probability. The first stage probability may be determined with limited information, such as with messages pre-classified by only one user. The second stage probability may be determined with a greater amount of aggregated information, such as with messages pre-classified by many users. Thus, it may be valuable to combine this first stage probably with the second stage probability to determine a more accurate probability.

However, the first stage probability may have such a high value that there may be no benefit to combining the first stage probability with the second stage probability. Accordingly, the spam guard module determines an upper limit to combine probabilities (upper-limit-to-combo) at an operation 308 of the preliminary phase. If the first stage probability is less than the upper-limit-to-combo and is greater than the lower-limit-to-combo, it may be appropriate to combine the first stage probability with the second stage probability to determine a more accurate combined probability. Details on determining the lower and upper limits are described below with regard to FIGS. 6A-6BC.

If the above preliminary phase parameters are available, they can be used during the live phase to determine whether received messages are spam. During the live phase, each user is associated with a subset-specific classifier. This subset-specific classifier is also sometimes referred to herein as a first stage classifier, because it uses the same, or similar logic as other first stage classifiers that are discussed herein. But the subset-specific classifier will use subset messages, such as those of a specific user, to determine a first stage probability (e.g., user-Pspam1). Thus, the subset-specific classifier may also be referred to as a user-specific classifier.

Similarly, during the live phase, each user is associated with a subset-specific master classifier. This subset-specific master classifier is also sometimes referred to herein as a second stage classifier, because it uses the same, or similar logic as other second stage classifiers that are discussed herein. But the subset-specific master classifier will also use subset messages, such as those of a specific user, together with other selected messages (e.g., of other users) to determine a second stage probability (e.g., user-Pspam-master).

However, when the second stage classifier (the master classifier) was trained during the preliminary phase as described above, the randomized master set of test messages may not have included the subset-specific test messages. For example, the randomized master set of test messages may not have included the test messages of the user who receives the new message during the live phase. When evaluating a new message for a particular user, it may be desirable to ensure that the particular user's spam/notspam designations also influence the second stage classifier (the master classifier). Thus, the second stage classifier is retrained at operation 310 with a subset-specific master set of test messages that includes the subset-specific test messages. For the current example, the second stage classifier is retrained with a user-specific master set of test messages that includes the messages designated as valid or spam by the receiving user.

In an alternative embodiment, the spam guard module may keep track of which subsets of messages were used in the randomized master set (e.g., which users were represented in the randomized master set). During the live phase, if the current subset (e.g., the current receiving user) was already represented in the randomized master set, the second stage classifier may not need to be retrained.

When the limit values and classifiers are prepared, the spam guard can process incoming new messages at an operation 312 of the live phase, to determine whether each of the received new messages is valid or spam. Details on classifying received new messages are described below with regard to FIG. 7.

Figure 4:
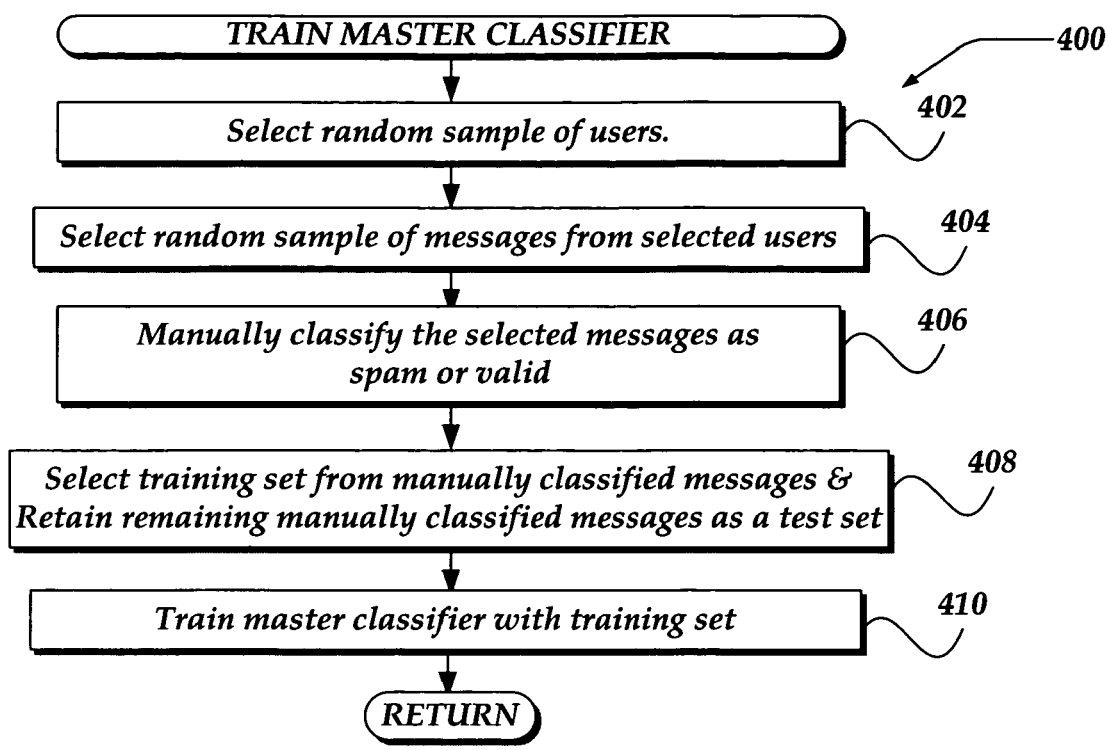
FIG. 4 illustrates a flow diagram generally showing one embodiment of a training process for training a master classifier during a preliminary phase.

FIG. 4 illustrates a flow diagram generally showing one embodiment of a training process 400 for training a master classifier (second stage classifier) during a preliminary phase. At an operation 402, the spam guard module selects a random sample of users with data that can be used for training, such as a sample of users with stored messages. In another embodiment, the spam guard module may use data from all users, from users of multiple messaging systems, or the like. In other embodiments, the spam guard module may select a sample of other sources such as advertisers (e.g., that identify valid messages), government agencies (e.g., that identify criminal messages), or the like.

Similarly, the spam guard module selects a random sample of messages from each of the selected users, at an operation 404. An administrator or other evaluator reviews the selected messages and classifies each message as valid or spam, at an operation 406. From the classified messages, the spam guard module selects a set of messages, at an operation 408. This set comprises the randomized master set (e.g., trainingset1), which can be used for training classifiers. Similarly, the spam guard module selects a subset of classified messages as the randomized test set (e.g., testset1), which can be used for testing classifiers in determining the combination threshold, the lower limit to combine probabilities, the upper limit to combine probabilities, or other parameters. At an operation 410, the spam guard module trains the master classifier (second stage classifier) with the randomized master set.

Figure 5A:
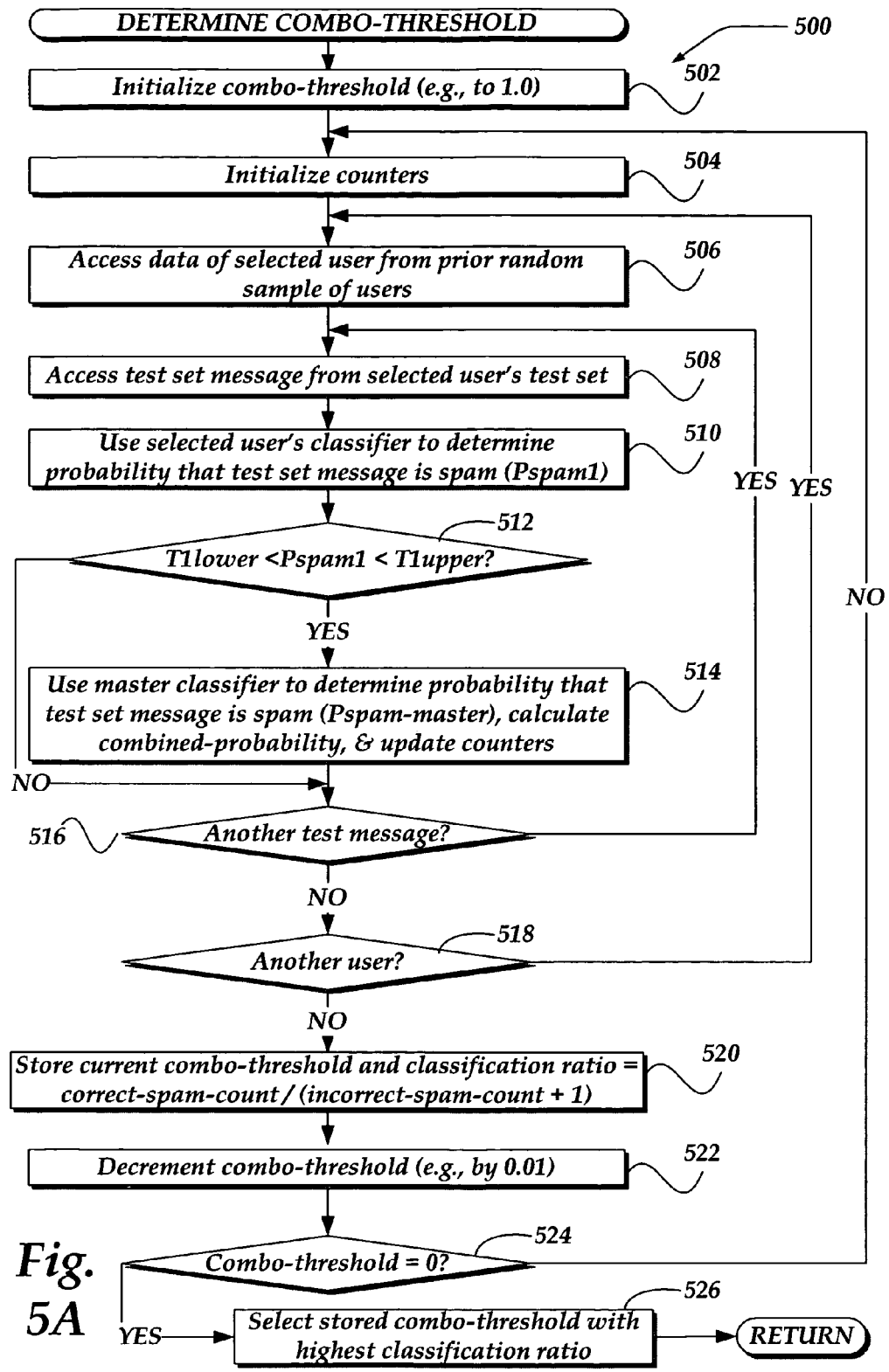
FIG. 5A illustrates a flow diagram generally showing one embodiment of a threshold determination process for determining a combination threshold value during the preliminary phase.

FIG. 5A illustrates a flow diagram generally showing one embodiment of a threshold determination process 500 for determining a combination threshold value (combo-threshold) during the preliminary phase. At an operation 502, the spam guard module initializes the combination threshold value. In this example, the combination threshold value is initialized to 1.0. Counters are also initialized at an operation 504. The spam guard module will count a number of messages that are correctly detected as spam (correct-spam-count) for a current combination threshold value. Similarly, the spam guard module will count a number of messages that are incorrectly detected as spam (incorrect-spam-count) for a current combination threshold value. The spam guard module will also count a number of messages that are listed as "unsure" for a current combination threshold value.

At an operation 506, the spam guard module accesses data of the first user from the previously selected random sample of users (e.g., the sample of users with stored messages). Associated with that first user is a subset of test messages (e.g., testset1) from the randomized master set of training messages. From that subset of test messages, the spam guard module accesses a first test message, at an operation 508. At an operation 510, the spam guard module uses the first user's Bayesian classifier (user-specific classifier) to determine a probability (Pspam1) that the first test message is spam. Because this probability is determined during the preliminary phase with the randomly selected test messages of the randomly selected users, this probability may be referred to as pre-Pspam1. This reflects the preliminary phase and the randomly selected data used by the user-specific classifier (e.g. a first stage classifier) to determine the probability. However, the classifier logic may be equivalent during both the preliminary phase and the live phase, although differing logic embodiments could be used in the two phases. As discussed above, somewhat different user data may be used during the live phase. Nevertheless, to simplify the description, the term Pspam1 will be used.

At a decision operation 512, the spam guard module determines whether the determined probability is within a range defined by the previously given lower and upper threshold parameters (T1Lower and T1Upper). If Pspam1 is less than the predefined lower threshold parameter (T1Lower), the spam guard module can be certain that the test message is not spam. In that case, there is no need to use a master classifier to determine a combined probability to help determine the combination threshold. Similarly, if Pspam1 is greater than the predefined upper threshold parameter (T1Upper), the spam guard module can be certain that the test message is spam. In that case, there is also no need to use the master classifier to determine a combined probability to help determine the combination threshold. Thus, the spam guard module may proceed to another test message or another user's test messages.

However, if Pspam1 is within the range defined by T1Lower and T1Upper, the spam guard module executes the master classifier at an operation 514 to determine a master probability and to calculate a combined probability. The spam guard module will compare the combined probability to the current combination threshold value to determine whether the test message is valid or spam. The spam guard module will also check that determination against the known pre-classification of that test message to determine whether the master classifier determined the correct classification using the current combination threshold. The result is also counted with the appropriate counter. More details of operation 514 are described below with regard to FIG. 5B.

After testing the classification determined by the master classifier, or if the master classifier was not needed for the current message, the spam guard module determines whether another test message is associated with the current test user, at a decision operation 516. If another test message is associated with the current user, control returns to operation 508 to access that next test message. That next test message is then evaluated as described above. When the current user's test messages are exhausted, the spam guard module determines whether another user's test messages are available, at a decision operation 518. If another user's test messages are available, control returns to operation 506 to access that next user's test messages. That next user's set of test messages are then evaluated as described above. Also as indicated above, other subsets of test messages may be used, besides those associated with users. For example, test messages may be grouped by geographic region, quality of service level, or other characteristics.

When all of the subsets of test messages have been exhausted, the spam guard module calculates a classification ratio at an operation 520. The calculated classification ratio indicates an accuracy of classifiers using the current combination threshold value. In one embodiment, the classification ratio is calculated as a correct-spam-count over a sum of an incorrect-spam-count plus one. The correct-spam-count is the number of test messages that were correctly determined to be spam by the above process while using the current combination threshold value. Conversely, the incorrect-spam-count is the number of test messages that were incorrectly determined to be spam by the above process while using the current combination threshold value. The calculated classification ratio is stored and associated with the current combination threshold value.

At an operation 522, the spam guard module decrements the combination threshold by a predefined increment (e.g. by 0.01). At a decision operation 524, the spam guard module determines whether the combination threshold value has reached an end value (e.g. zero). If the combination threshold value has not yet reached the end value, control returns to operation 504, and the entire process is repeated using the new combination threshold value. After the process has been completed for each increment of the combination threshold value, the spam guard module selects the stored combination threshold value that is associated with the highest classification ratio. Accordingly, the selected combination threshold value is most likely to enable the classifiers to accurately determine whether new messages are valid or spam during the live phase.

Figure 5B:
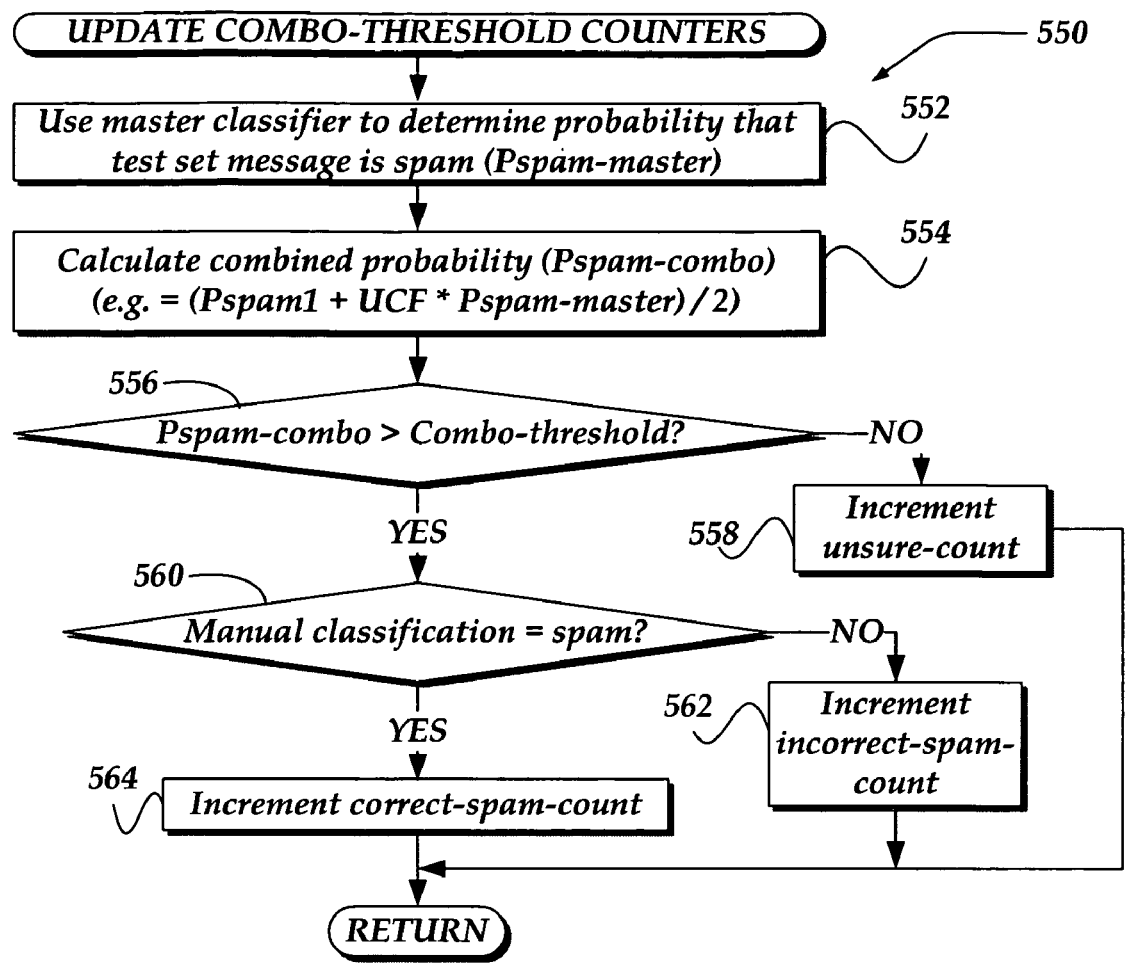
FIG. 5B illustrates a flow diagram generally showing one embodiment of details for a master classification and counter update process during the preliminary phase.

FIG. 5B illustrates a flow diagram generally showing one embodiment of details for a master classification and counter update process 550 during the preliminary phase. This process corresponds to operation 514 of FIG. 5A. At an operation 552 of FIG. 5B, the spam guard module uses a master classifier (a second stage classifier) to determine a probability (Pspam-master) that a current test message is a spam message. Similar to the term Pspam1, the term Pspam-master is used to simplify the description. Because this probability is determined during the preliminary phase with the randomly selected test messages of the randomly selected users, this probability may be referred to as pre-Pspam-master (or pre-Pspam2). This reflects the preliminary phase and the randomly selected data used by the master classifier (e.g. a second stage classifier) to determine the probability. However, the classifier logic may be equivalent during both the preliminary phase and the live phase, although differing logic embodiments could be used in the two phases. As discussed above, somewhat different user data may be used during the live phase. Nevertheless, to simplify the description, the term Pspam-master will be used.

At an operation and 554, the spam guard module calculates a combined probability (Pspam-combo) based on Pspam1 and Pspam-master. In one embodiment, the combined probability may comprise a weighted average of Pspam1 and Pspam-master. An example formula may be:

$$(P\text{spam1}+UCF*P\text{spam-master})/2$$

UCF is a user confidence factor that can be predefined or derived by experimentation. In this embodiment, the UCF controls the weight given to the probability determined by the master classifier. In another embodiment the UCF may be applied to Pspam1, or different factors may be applied to both probabilities. For example, the UCF may be predefined or derived by experimentation for each user to determine how well each user trains his or her classifier by manually identifying received messages as valid or spam.

Similar to the terms Pspam1 and Pspam-master, the term Pspam-combo is used to simplify the description. Because this probability is determined during the preliminary phase with the randomly selected test messages of the randomly selected users, this probability may be referred to as pre-Pspam-combo. This reflects the preliminary phase and the roots of the combined probability in randomly selected data used. However, the combination may be equivalent during both the preliminary phase and the live phase, although alternate calculations could be used in each phase. As discussed above, somewhat different user data may be used during the live phase. Nevertheless, to simplify the description, the term Pspam-combo will be used.

At a decision operation and 556, the spam guard module determines whether the combined probability is greater than the current combination threshold value. If the combined probability is less than the current combination threshold value, the spam guard module increments and unsure count, at an operation 558. The unsure account indicates a degree to which the current combination threshold value fails to improve the classification of messages as valid or spam. Control then returns to the calling process to perform other operations (e.g., to decision operation and 516 of FIG. 5A).

If the combined probability is greater than the current combination threshold value, the test message is considered to be a spam message. To confirm whether this conclusion is correct, the spam guard module checks the previous manual classification of the test message, at a decision operation 560 of FIG. 5B. If the manual classification of the test message does not match the determination made based on the combined probability (i.e., the test message is not spam), the spam guard module increments a counter of incorrect spam decisions (incorrect-spam-count), at an operation 562. Conversely, if the manual classification of the test message also indicates that the test message is a spam message, the spam guard module increments a counter of correct spam decisions (correct-spam-count), at an operation 564. In either case, control then returns to the calling process to perform other operations (e.g., operation and 516 of FIG. 5A).

Figure 6A:
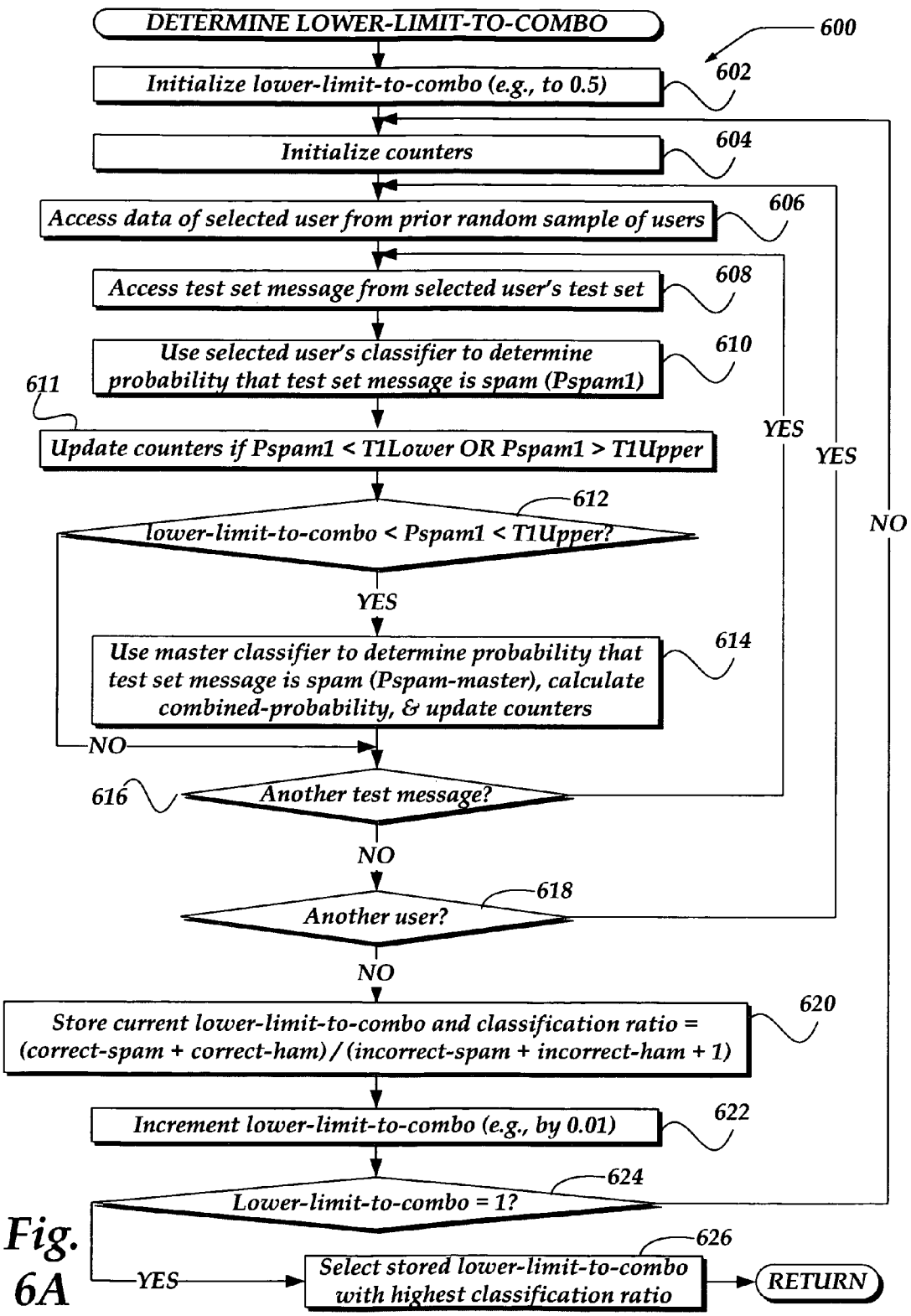
FIG. 6A illustrates a flow diagram generally showing one embodiment of a lower limit determination process for determining a lower limit to combine probabilities (lower-limit-to-combo) during the preliminary phase.

FIG. 6A illustrates a flow diagram generally showing one embodiment of a lower limit determination process 600 for determining a lower limit to combine probabilities (lower-limit-to-combo) during the preliminary phase. This example process is somewhat similar to the example process described above for determining the combination threshold. But the lower limit determination process 600 includes some additions and differences. At an operation 602, the spam guard module initializes the lower-limit-to-combo value. In this example, the lower-limit-to-combo value is initialized to 0.5.

Counters are also initialized at an operation 604. The spam guard module will count a number of messages that are correctly detected as spam (correct-spam-count) for a current lower-limit-to-combo value. Similarly, the spam guard module will count a number of messages that are incorrectly detected as spam (incorrect-spam-count) for a current lower-limit-to-combo value. In addition, the spam guard module will count a number of messages that are correctly detected as valid (ham) (correct-ham-count) for a current lower-limit-to-combo value. Similarly, the spam guard module will count a number of messages that are incorrectly detected as valid (incorrect-ham-count) for a current lower-limit-to-combo value. The spam guard module will also count a number of messages that are listed as "unsure" for a current lower-limit-to-combo value.

At an operation 606, the spam guard module accesses data of the first user from the previously selected random sample of users (e.g., the sample of users with stored messages). As discussed above, associated with that first user is a subset of test messages (e.g., testset1) from the randomized master set of training messages. From that subset of test messages, the spam guard module accesses a first test message, at an operation 608. At an operation 610, the spam guard module uses the first user's Bayesian classifier (user-specific classifier) to determine a probability (Pspam1) that the first test message is spam. Also as discussed above, because this probability is determined during the preliminary phase with the randomly selected test messages of the randomly selected users, this probability may be referred to as pre-Pspam1. Although different data may be used during the live phase, the description is simplified by using the same term Pspam1.

At a decision operation 611, the spam guard module determines whether the determined probability Pspam1 from the first stage classifier is outside the range defined by the previously given lower and upper threshold parameters (T1Lower and T1Upper). If later, during the live phase, Pspam1 is less than the predefined lower threshold parameter (T1Lower), the spam guard module should be certain that the test message is not spam. In that case, there would be no need to use a master classifier to determine a combined probability to help determine the combination threshold. However, during this preliminary phase, the spam guard module checks the accuracy of the first stage classifier. Similarly, if during the live phase, Pspam1 is greater than the predefined upper threshold parameter (T1Upper), the spam guard module should be certain that the test message is spam. In that case, there is would also be no need to use the master classifier to determine a combined probability to help determine the combination threshold. However, during this preliminary phase, the spam guard module checks the accuracy of the first stage classifier. Corresponding counters can also be updated. More details of operation 611 are described below with regard to FIG. 6B.

To check the accuracy of the current lower-limit-to-combo value, a further check is performed at a decision operation 612 relative to the current lower-limit-to-combo value. If Pspam1 is within the range defined by the lower-limit-to-combo and T1Upper, the spam guard module executes the master classifier at an operation 614 to determine a master probability and to calculate a combined probability. The spam guard module will compare the combined probability to the previously determined combination threshold value to determine whether the test message is valid or spam. The spam guard module will also check that determination against the known pre-classification of that test message to determine whether the process determined the correct classification in view of the current value of lower-limit-to-combo. The result is also counted with the appropriate counter. More details of operation 614 are described below with regard to FIG. 6C.

After testing the classification determined by the master classifier, or if the master classifier was not needed for the current message, the spam guard module determines whether another test message is associated with the current test user, at a decision operation 616. If another test message is associated with the current user, control returns to operation 608 to access that next test message. That next test message is then evaluated as described above. When the current user's test messages are exhausted, the spam guard module determines whether another user's test messages are available, at a decision operation 618. If another user's test messages are available, control returns to operation 606 to access that next user's test messages. That next user's set of test messages are then evaluated as described above. Also as indicated above, other subsets of test messages may be used, besides those associated with users. For example, test messages may be grouped by geographic region, quality of service level, or other characteristics.

When all of the subsets of test messages have been exhausted, the spam guard module calculates another classification ratio at an operation 620. This calculated classification ratio indicates an accuracy of the process in view of the current value of lower-limit-to-combo. In one embodiment, the classification ratio is calculated as correct counts over incorrect counts. An example formula may be expressed as follows:

$$(\text{correct-spam-count} + \text{correct-ham-count}) / (\text{incorrect-spam-count} + \text{incorrect-ham-count} + 1)$$

The correct-spam-count is the number of test messages that were correctly determined to be spam by the above process while using the current value for lower-limit-to-combo. Similarly, the correct-ham-count is the number of test messages that were correctly determined to be valid by the above process while using the current value for lower-limit-to-combo. Conversely, the incorrect-spam-count is the number of test messages that were incorrectly determined to be spam by the above process while using the current value for lower-limit-to-combo. Similarly, the incorrect-ham-count is the number of test messages that were incorrectly determined to be valid by the above process while using the current value for lower-limit-to-combo. The calculated classification ratio is stored and associated with the current value for lower-limit-to-combo.

At an operation 622, the spam guard module increments the combination threshold by a predefined increment (e.g. by 0.01). At a decision operation 624, the spam guard module determines whether the value of lower-limit-to-combo has reached an end value (e.g. 1). If the value of lower-limit-to-combo has not yet reached the end value, control returns to operation 604, and the entire process is repeated using the new value of lower-limit-to-combo. After the process has been completed for each increment of the value of lower-limit-to-combo, the spam guard module selects the stored value of lower-limit-to-combo that is associated with the highest classification ratio. Accordingly, the selected value of lower-limit-to-combo is most likely to enable the classifiers to accurately determine whether new messages are valid or spam during the live phase.

Figure 6B:
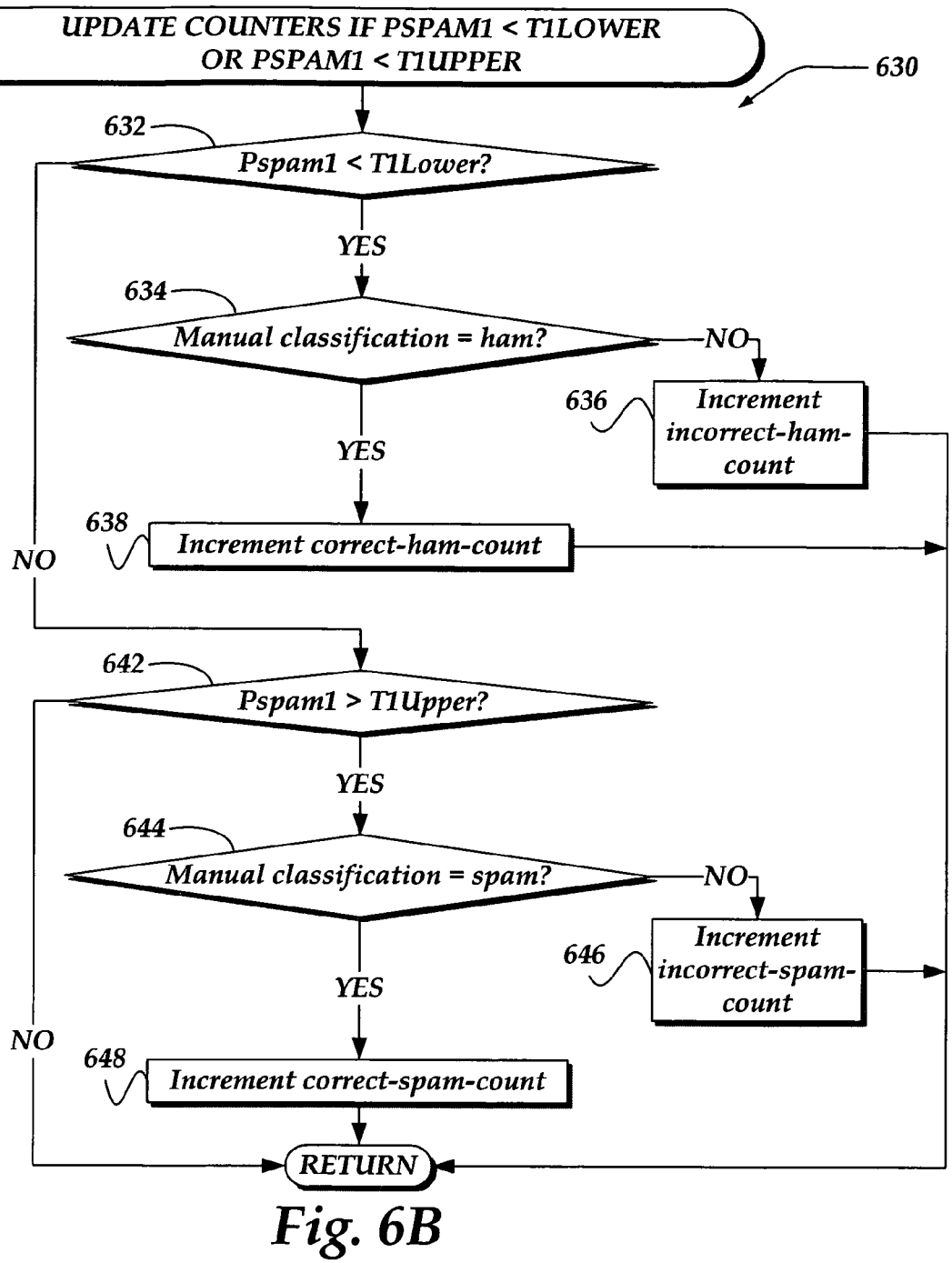
FIG. 6B illustrates a flow diagram generally showing one embodiment of details of a first stage classifier accuracy check process during the preliminary phase.

FIG. 6B illustrates a flow diagram generally showing one embodiment of details of a first stage classifier accuracy check process 630 during the preliminary phase. This process corresponds to operation and 611 of FIG. 6A. At a decision operation 632, the spam guard module determines whether Pspam1 is less than the predefined lower limit value T1Lower. If Pspam1 is less than T1Lower, the test message should be considered valid (ham). However, the spam guard module checks this classification relative to the known classification of the test message. Accordingly, at a decision operation 634 the spam guard module determines whether the test message was previously manually classified as valid (ham). If the test message was previously manually classified as spam, the spam guard module notes this error by incrementing an incorrect-ham-count, at an operation 636. Control then returns to the calling process. Conversely, if the test message was previously manually classified as valid, the spam guard module notes the correct determination by incrementing a correct-ham-count, an operation 638. Control then returns to the calling process.

If the first stage classifier determined a value of Pspam1 that is greater than the lower limit value T1Lower, the spam guard module checks the accuracy of the first stage classifier relative to the previously manually classified test message. At a decision operation 642, the spam guard module determines whether Pspam1 is greater than the predefined upper limit value T1Upper. If Pspam1 is greater than T1Upper, the test message should be considered spam. However, the spam guard module checks this classification relative to the known classification of the test message. Accordingly, at a decision operation 644 the spam guard module determines whether the test message was previously manually classified as spam. If the test message was previously manually classified as valid (ham), the spam guard module notes this error by incrementing an incorrect-spam-count, at an operation 646. Control then returns to the calling process. Conversely, if the test message was previously manually classified as spam, the spam guard module notes the correct determination by incrementing a correct-spam-count, an operation 648. Control then returns to the calling process.

Figure 6C:
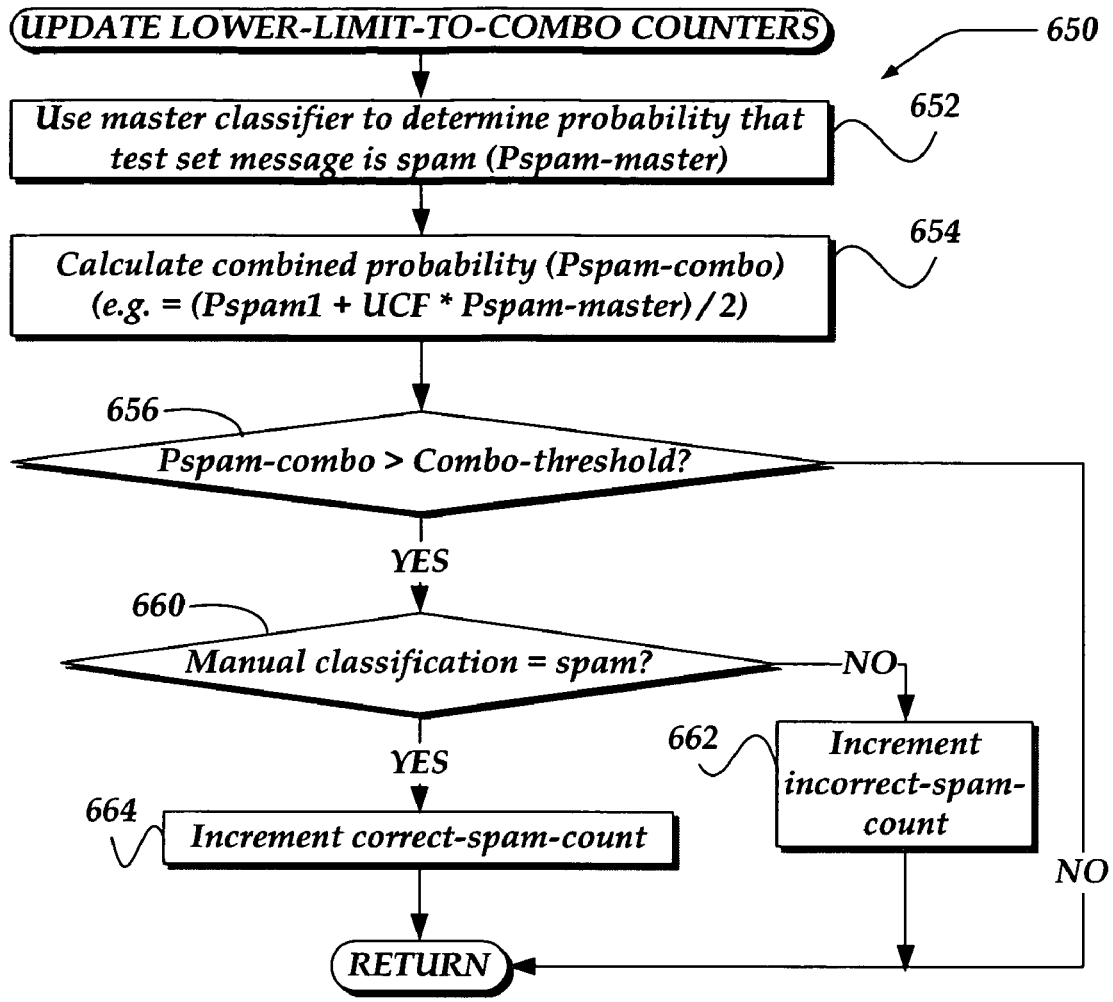
FIG. 6C illustrates a flow diagram generally showing one embodiment of details for a master classification and counter update process during the preliminary phase.

FIG. 6C illustrates a flow diagram generally showing one embodiment of details for a master classification and counter update process 650 during the preliminary phase. This process corresponds to operation 614 of FIG. 6A. At an operation 652 of FIG. 6C, the spam guard module uses a master classifier (a second stage classifier) to determine a probability (Pspam-master) that a current test message is a spam message. As described above, the term Pspam-master is used to simplify the description. Because this probability is determined during the preliminary phase for various parameters with the randomly selected test messages of the randomly selected users, this probability may be referred to as pre-Pspam-master-lower-limit. This reflects the preliminary phase, the lower-limit-to-combo process, and the randomly selected data used by the master classifier (e.g. a second stage classifier) to determine the probability. For example, as discussed above, somewhat different user data may be used during the live phase. However, the classifier logic may be equivalent during both the preliminary phase and the live phase, and for each of the various parameters, although differing logic embodiments could be used in the two phases or for each parameter. Nevertheless, to simplify the description, the term Pspam-master will be used here also.

At an operation and 654, the spam guard module calculates a combined probability (Pspam-combo) based on Pspam1 and Pspam-master. Again in one embodiment, the combined probability may comprise a weighted average of Pspam1 and Pspam-master. Thus, an example formula may again be:

$$(Pspam1+UCF*Pspam\text{-}master)/2$$

Also as described above, UCF is a user confidence factor that can be predefined or derived by experimentation. In this embodiment, the UCF controls the weight given to the probability determined by the master classifier. In another embodiment the UCF may be applied to Pspam1, or different factors may be applied to both probabilities.

Similar to the terms Pspam1 and Pspam-master, the term Pspam-combo is again used to simplify the description. Because this probability is determined during the preliminary phase with the randomly selected test messages of the randomly selected users, and is relative to the current lower-limit-to-combo value, this probability may be referred to as pre-Pspam-combo-lower-limit. This reflects the preliminary phase, the roots of the combined probability in randomly selected data used, and the relation to the lower-limit-to-combo value. However, the combination may be equivalent during both the preliminary phase and the live phase, and for each of the various parameters, although alternate calculations could be used in each phase. As discussed above, somewhat different user data may be used during the live phase. Nevertheless, to simplify the description, the term Pspam-combo will be used here also.

At a decision operation and 656, the spam guard module determines whether the combined probability is greater than the previously determined combination threshold value, which was determined with the process of FIG. 5A. If the combined probability is less than the previously determined combination threshold value, control returns the calling process (e.g., to decision operation and 616 of FIG. 6A). In one embodiment, an unsure count may be incremented.

If the combined probability is greater than the previously determined combination threshold value, the test message is considered to be a spam message. To confirm whether this conclusion is correct, the spam guard module checks the previous manual classification of the test message, at a decision operation 660 of FIG. 6C. If the manual classification of the test message does not match the determination made based on the combined probability (i.e., the test message is not spam), the spam guard module increments a counter of incorrect spam decisions (incorrect-spam-count), at an operation 662. Conversely, if the manual classification of the test message also indicates that the test message is a spam message, the spam guard module increments a counter of correct spam decisions (correct-spam-count), at an operation 664. In either case, control then returns to the calling process to perform other operations (e.g., operation and 616 of FIG. 6A).

In addition to incrementally determining the lower limit to combination value (lower-limit-to-combo) during the preliminary phase, the spam guard module incrementally determines and upper limit to combination value (upper-limit-to-combo). The logic may be similar to that described above for determining the lower limit to combination value, except for some appropriate changes. In one embodiment, the spam guard module initializes upper-limit-to-combo to the value determined for the lower limit to combination. The spam guard module need not increment upper-limit-to-combo through an entire range, such as zero to one, because the lower-limit-to-combo was already determined. Thus, the spam guard module may start from the value determined for lower-limit-to-combo. Rather than decrementing down to a lower limit value such as zero, the spam guard module may increment the upper-limit-to-combo value by 0.01 up to 1.0. The spam guard module would then iterate through a process similar to that of FIGS. 6A-6C, incrementing each value of upper-limit-to-combo, and then would select the value of upper-limit-to-combo that corresponds to the highest classification ratio.

After the threshold parameters are determined, the classifiers may be retrained with a receiving user's data for the live phase. Subsequently received new messages can then be classified during the live phase.

FIG. 7 illustrates a flow diagram generally showing one embodiment of a new message classification process 700 for determining whether a newly received is a valid message or a spam message during the live phase. At an operation 702, the spam guard module evaluates a newly received message with the destination user's classifier to calculate a probability (Pspam1) that the newly received message is a spam message. The destination user's classifier is generally a first-stage classifier, such as a Bayesian filter, that uses the destination user's pre-classified messages to determine the first-stage probability. Because this probability is determined during the live phase with the messages of the destination user, this probability may be referred to as live-user-Pspam1. This reflects the live phase and the user-specific data used by the user-specific classifier to determine the probability. However, the classifier logic may be equivalent during both the preliminary phase and the live phase, although differing logic embodiments could be used in the two phases. Despite the differences in data and phase, the term Pspam1 will still be used, to simplify the description.

At a decision operation 704, the spam guard module evaluates Pspam1 relative to the range defined by T1Lower and T1Upper to determine whether the user's first stage classifier is unsure how to classify the received message. If Pspam1 is less than T1Lower, the spam guard module may be certain that the received message is valid (not spam). Similarly, if Pspam1 is greater than T1Upper, the spam guard module may be certain that the received message is spam. If either of these certainties is detected, the spam guard module applies the determined classification to the received message, and returns the determined classification at an operation 706 to the users corresponding message service, such as an email service. Control then returns to the corresponding message service.

However, if Pspam1 falls within the range defined by T1Lower and T1Upper, they user's first stage classifier is unsure how to classify the received message. In that case, the second stage classification may be used. At an operation 708, the spam guard module accesses the previously determined lower and upper limits to combination (lower-limit-to-combo and upper-limit-to-combo). The spam guard module evaluates the first stage probability relative to the lower limit to combination, at a decision operation 710. More specifically, if Pspam1 is less than lower-limit-to-combo, the spam guard module may be relatively certain that the received message is valid. In that case, the second stage classifier need not be used. Instead, the spam guard module may indicate that the received message is valid and return that determined classification to the user's messaging service. However, various embodiments may treat this level of certainty in different ways. In the illustrated embodiment, the spam guard module simply retains the "unsure" classification determined by the first stage classifier, and returns that classification to the user's messaging service at an operation 712. The users messaging service may then perform other operations, such as routing the received message to a human reviewer who may make a final classification. Control then returns to the corresponding message service.

If Pspam1 is greater than lower-limit-to-combo, the spam guard module evaluates the first stage probability relative to the upper limit to combination, at a decision operation 714. More specifically, if Pspam1 is greater than upper-limit-to-combo, the spam guard module may be relatively certain that the received message is spam. In that case the second stage classifier need not be used. Instead, the spam guard module may indicate that the received message is spam and return that determined classification to the user's messaging service, at an operation 716. In another embodiment, the spam guard module simply retains the "unsure" classification determined by the first stage classifier, and returns that classification to the user's messaging service. Control then returns to the corresponding message service.

If Pspam1 falls within the range defined by lower-limit-to-combo and upper-limit-to-combo, the spam guard module may evaluate the received message with a second-stage classifier at an operation 718. The second stage classifier is generally a master classifier, such as another Bayesian filter, as used in the preliminary phase. However, this live phase master classifier uses the destination user's pre-classified messages along with other randomized master set messages to determine a master-stage probability. Because this probability is determined during the live phase with the messages of the destination user, this probability may be referred to as live-user-Pspam-master. This reflects the live phase and the user-specific data used by the master classifier with the other randomized data to determine the master-stage probability. However, the classifier logic may be equivalent during both the preliminary phase and the live phase, although differing logic embodiments could be used in the two phases. Despite the differences in data and phase, the term Pspam-master will still be used, to simplify the description.

At a decision operation 720, the spam guard module determines whether the determined Pspam-master value is less than the lower-limit-to-combo value. If true, the spam guard module may be more certain that the received message is valid. In that case, the spam guard module may indicate that the received message is valid and return that determined classification to the user's messaging service. However, various embodiments may treat this level of certainty in different ways. In the illustrated embodiment, the spam guard module simply retains the "unsure" classification determined by the first stage classifier, and returns that classification to the user's messaging service at an operation 722. The users messaging service may then perform other operations, such as routing the received message to a human reviewer who may make a final classification. Control then returns to the corresponding message service.

If the determined Pspam-master value is greater than the lower-limit-to-combo value, the spam guard module calculates a combined probability value (Pspam-combo), at an operation 724. Similar to the preliminary phase, in this embodiment, the combined probability value for the live phase is calculated as a weighted average according to the following formula:

$$(P\text{spam1} + UCF * P\text{spam-master})/2$$

In this embodiment, the user confidence factor (UCF) controls the weight given to the probability determined by the master classifier. In another embodiment the UCF may be applied to Pspam1, or different factors may be applied to both probabilities. For example, the UCF may be predefined or derived by experimentation for the receiving user to determine how well the receiving user trains his or her classifier by manually identifying received messages as valid or spam. Also as noted above, the term Pspam-combo is used to simplify the description, rather than live-user-Pspam-combo or other more lengthy term.

At a decision operation 726, the spam guard module determines whether the combined probability is greater than the combination threshold value (combo-threshold) that was previously determined in the preliminary phase. If Pspam-combo is less than combo-threshold, the spam guard module still can not be sure that the received message is a spam message. In that case, the spam guard module classifies the received message as "uncertain" and returns that classification to the user's messaging service at operation 722. However, if Pspam-combo is greater than combo-threshold, the spam guard module can be more certain than the user's first stage classifier, that the received message is a spam message. Accordingly, the spam guard module classifies the received message as spam at an operation 728, and returns that classification to the user's messaging service. The spam guard module may also log this classification, or any of the other classifications, for further training of the user's first stage classifier or of other classifiers. Control then returns to the corresponding message service to await another new message.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. For example, a third-stage classifier may be used based on test messages from other data sets, such as another set of randomly selected messages, a set of messages of a different type (e.g., instant messages, SMS messages, etc.), a set of messages from differing geographic regions, messages, or the like. The combined threshold could then comprise a weighted average of three or more probability values. For example, Pspam-master may be determined as described above for email messages, but a Pspam3 value could be determined for SMS messages. Pspam1, Pspam-master, and Pspam3 could be combined to provide additional accuracy in spam detection. Since many embodiments of the invention can be made without departing from the spirit and scope of the invention, the invention resides in the claims hereinafter appended.

What is claimed as new and desired to be protected by Letters Patent is:

1. A computer implemented method for detecting spam messages, comprising:
    determining a first stage probability of whether a received message is a spam message, wherein the first stage probability is determined by evaluating the received message in relation to a subset of test messages, wherein each subset test message in the subset of test messages was previously identified as either valid or spam;
    receiving an indication that a first stage classifier is unsure, based on the first stage probability, as to whether the received message is a spam message;
    determining that the first stage probability is greater than a lower limit for combining probabilities and is less than an upper limit for combining probabilities, wherein the lower limit for combining probabilities indicates a probability value below which the first stage probability will not be combined with a second stage probability to determine whether the received message is a spam message, and wherein the upper limit for combining probabilities indicates a probability value above which the received message is marked as a spam message without combining the first stage probability with the second stage probability and wherein the determining the lower limit is determined by:
        setting the lower limit to an initial value;
        counting correctly identified spam messages from a randomized test set of messages;
        counting correctly identified valid messages from the randomized test set of messages;
        counting incorrectly identified spam messages from the randomized test set of messages;
        counting incorrectly identified valid messages from the randomized test set of messages;
        calculating, for each of multiple incremental values of the lower limit, a lower limit classification ratio as a ratio of:
            a first sum of:
                the count of the correctly identified spam messages; and
                the count of the correctly identified valid messages;
                over a second sum of:
                the count of the incorrectly identified spam messages;
                the count of the incorrectly identified valid messages; and one; and
            selecting the incremental value of the lower limit that corresponds to the highest value of the lower limit classification ratio;
    determining a second stage probability of whether the received message is a spam message, wherein the second stage probability is determined by evaluating the received message in relation to a subset-specific master set of test messages, which includes the subset of test messages, wherein each subset-specific master set test message in the subset-specific master set of test messages was previously identified as either valid or spam;
    computing a combined probability based on the first stage probability and the second stage probability;
    determining that the combined probability is greater than a threshold probability at which a threshold classification ratio is highest, wherein the classification ratio comprises a ratio of correctly identified spam messages over incorrectly identified spam messages.

2. The method of claim 1, wherein the subset of test messages comprises subset test messages that were each identified as either valid or spam by a particular message recipient.

3. The method of claim 1, wherein the subset-specific master set of test messages comprises subset-specific master set test messages that were identified as either valid or spam by a plurality of message recipients, including a particular message recipient.

4. The method of claim 1, wherein at least one of the first stage classifier and the second stage classifier comprise a Bayesian filter.

5. The method of claim 1, wherein the first stage classifier is unsure if the first stage probability is:
    greater than an empirically determined lower threshold; and
    less than an empirically determined upper threshold.

6. The method of claim 1, wherein counting correctly identified spam messages comprises:
    using the first stage classifier to determine a preliminary phase user probability that a randomized test set message is a spam message;
    using the second stage classifier to determine a preliminary phase master probability that the randomized test set message is a spam message;
    computing a preliminary phase combined probability based on the preliminary phase user probability and the preliminary phase master probability;
    determining that the preliminary phase combined probability is greater than the threshold probability; and
    determining that the randomized test set message was previously identified as spam.

7. The method of claim 1, further comprising determining the upper limit for combining probabilities by performing the steps of claim 5, except replacing the lower limit with the upper limit;
    replacing the initial value with the lower limit; and replacing the lower limit classification ratio with an upper limit classification ratio.

8. The method of claim 1, wherein the combined probability is computed according to the following formula:

$$(P\text{spam1} + UCF \cdot P\text{spam2})/2,$$

wherein:
Pspam1 is the first stage probability;
Pspam2 is the second stage probability; and
UCF is a user confidence factor for weighting the second stage probability.

9. The method of claim 1, wherein prior to determining the first stage probability, further comprising:
training the second stage classifier based on a randomized master set of test messages, each of which is pre-classified as either valid or spam;
determining the threshold probability based on a threshold classification ratio of correct spam counts and incorrect spam counts determined through an evaluation of the subset of test messages with the trained second stage classifier and the first stage classifier;
determining the lower limit for combining probabilities based on a lower limit classification ratio as a function of correct spam counts, correct valid message counts, incorrect spam counts, and incorrect valid message counts determined through an evaluation of the subset of test messages with the trained second stage classifier and the first stage classifier;
determining the upper limit for combining probabilities based on an upper limit classification ratio as a function of correct spam counts, correct valid message counts, incorrect spam counts, and incorrect valid message counts determined through an evaluation of the subset of test messages with the trained second stage classifier and the first stage classifier;
training the first stage classifier based on the subset of test messages; and
retraining the second stage classifier based on a subset-specific master set of test messages that includes the subset of test messages.

10. A computer readable storage medium that is not a signal, storing computer readable instructions that cause a computing device to perform the steps of claim 1.

11. A system for detecting spam messages, comprising:
a processor;
a communication interface in communication with the processor and in communication with an electronic network;
a memory in communication with the processor and storing computer readable instructions that cause the processor to perform a plurality of operations, including:
determining a first stage probability of whether a received message is a spam message, wherein the first stage probability is determined by evaluating the received message in relation to a subset of test messages, wherein each subset test message in the subset of test messages was previously identified as either valid or spam;
receiving an indication that a first stage classifier is unsure, based on the first stage probability, as to whether the received message is an spam message;
determining that the first stage probability is greater than a lower limit for combining probabilities and is less than an upper limit for combining probabilities, wherein the lower limit for combining probabilities indicates a probability value below which the first stage probability will not be combined with a second stage probability to determine whether the received message is a spam message, and wherein the upper limit for combining probabilities indicates a probability value above which the received message is marked as a spam message without combining the first stage probability with the second stage probability, and wherein the determining the lower limit is determined by:
setting the lower limit to an initial value;
counting correctly identified spam messages from a randomized test set of messages;
counting correctly identified valid messages from the randomized test set of messages;
counting incorrectly identified spam messages from the randomized test set of messages:;
counting incorrectly identified valid messages from the randomized test set of calculating, for each of multiple incremental values of the lower limit, a lower limit classification ratio as a ratio of:
a first sum of:
the count of the correctly identified spam messages and
the count of the correctly identified valid messages; over a second sum of:
the count of the incorrectly identified spam messages
the count of the incorrectly identified valid messages; and one; and
selecting the incremental value of the lower limit that corresponds to the highest value of the lower limit classification ratio;
determining a second stage probability of whether the received message is a spam message, wherein the second stage probability is determined by evaluating the received message in relation to a master set of test messages, which includes the subset of test messages, wherein each master set test message in the master set of test messages was previously identified as either valid or spurn;
computing a combined probability based on the first stage probability and the second stage probability;
determining that the combined probability is greater than a threshold probability at which a threshold classification ratio is highest, wherein the classification ratio comprises a ratio of correctly identified spam messages over incorrectly identified spam messages.

12. The system of claim 11, wherein the subset of test messages comprises subset test messages that were each identified by a message recipient as either valid or spam.

13. The system of claim 11, wherein the master set of test messages comprises master set test messages that were identified by a plurality of message recipients as either valid or spam.

14. The system of claim 11, wherein the computer readable instructions cause the processor to perform further operations for counting correctly identified spam messages, including:
using the first stage classifier to determine a preliminary stage user probability that a statistical test set message is a spam message;
using the second stage classifier to determine a preliminary stage master probability that the statistical test set message is a spam message;
computing a preliminary stage combined probability based on the preliminary stage user probability and the preliminary stage master probability;
determining that the preliminary stage combined probability is greater than the threshold probability; and determining that the statistical test set message was previously identified as spam.

15. The system of claim 11, wherein the combined probability is computed according to the following formula:

($P$spam1+$UCF$*$P$spam2)/2, wherein:

Pspam1 is the first stage probability;
Pspam2 is the second stage probability; and UCF is a user confidence factor for weighting the second stage probability.

16. The system of claim 11, wherein prior to determining the first stage probability, the computer readable instructions cause the processor to perform further operations, including:
training the second stage classifier with randomly sampled messages, each of which is pre-classified as either valid or spam;
determining the threshold probability based on a threshold classification ratio of correct spam counts and incorrect spam counts determined through an evaluation of the subset of test messages with the trained second stage classifier and the first stage classifier;
determining the lower limit for combining probabilities based on a lower limit classification ratio as a function of correct spam counts, correct valid message counts, incorrect spam counts, and incorrect valid message counts determined through an evaluation of the subset of test messages with the trained second stage classifier and the first stage classifier;
determining the upper limit for combining probabilities based on an upper limit classification ratio as a function of correct spam counts, correct valid message counts, incorrect spam counts, and incorrect valid message counts determined through an evaluation of the subset of test messages with the trained second stage classifier and the first stage classifier;
training the first stage classifier based on the subset of test messages; and
re-training the second stage classifier with the master set of test messages.

* * * * *